March 21, 1950     N. COOPER     2,501,161
WATER TUBE BOILER
Filed Sept. 19, 1946     3 Sheets-Sheet 3
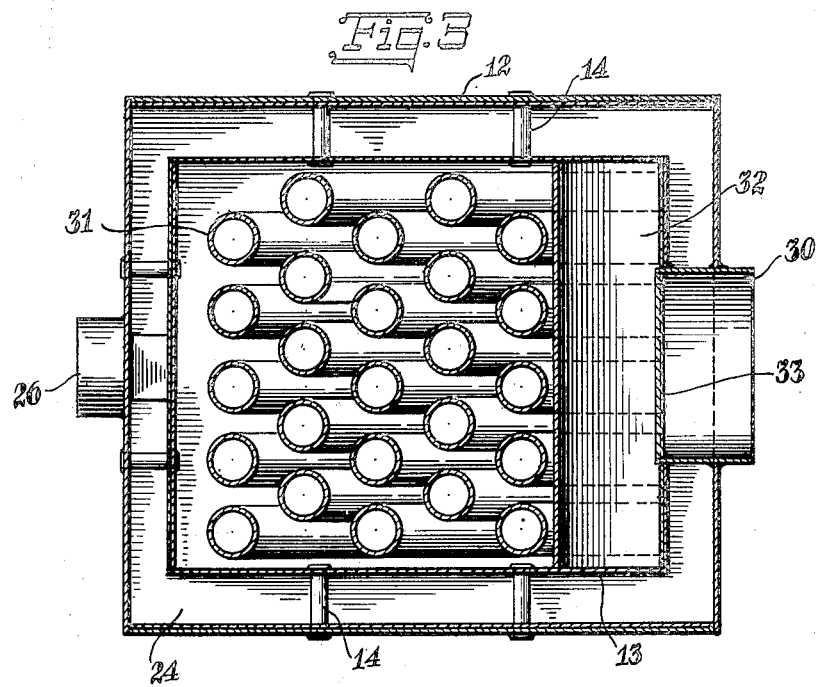
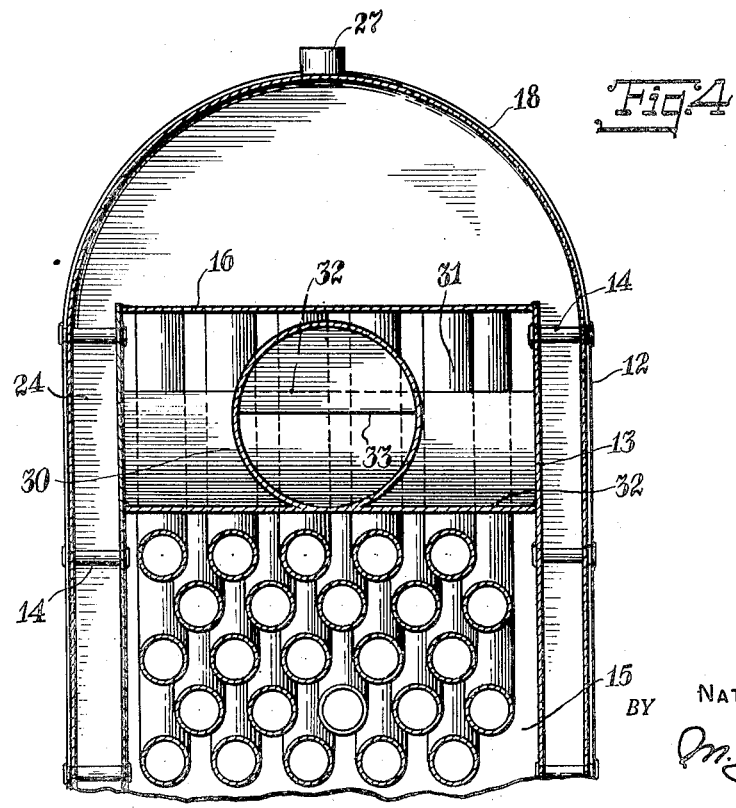
INVENTOR.
NATHAN COOPER
BY
ATTY.

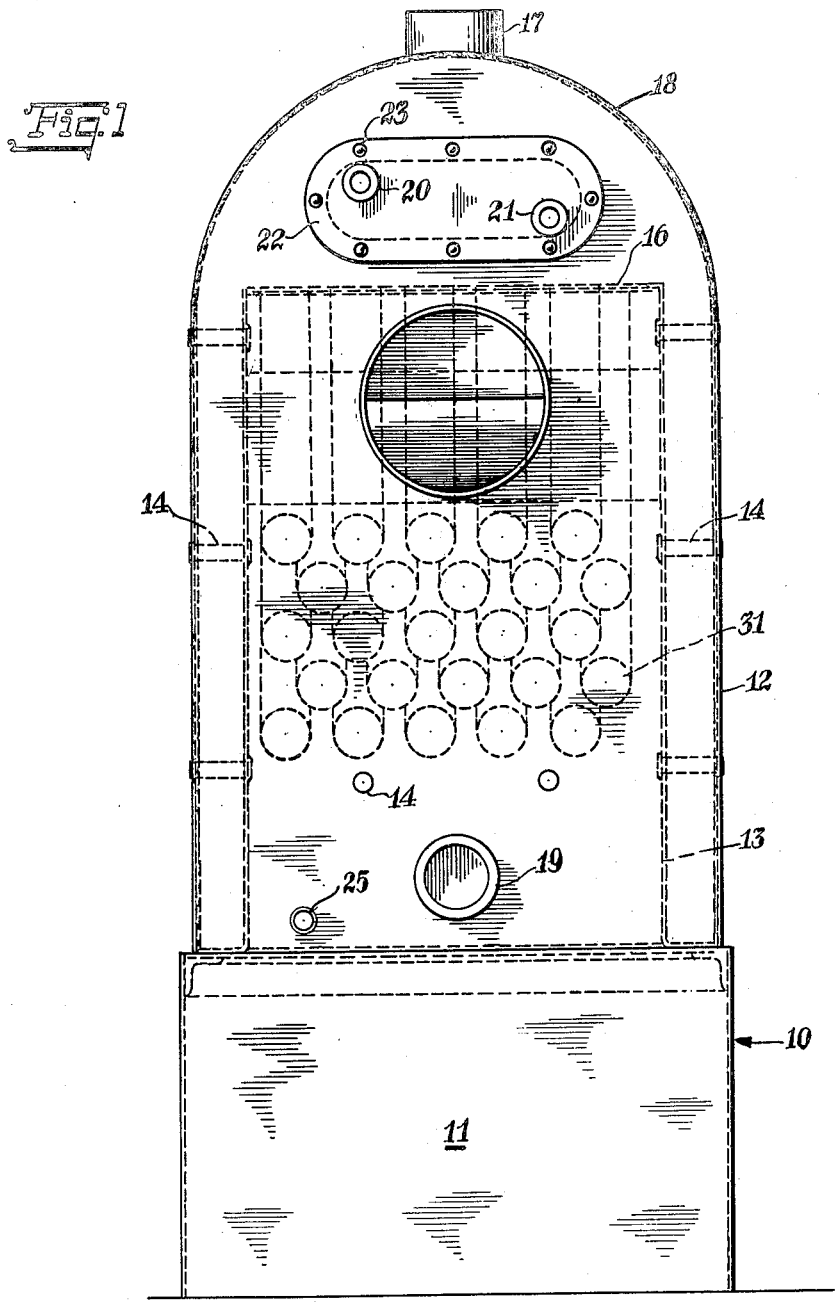

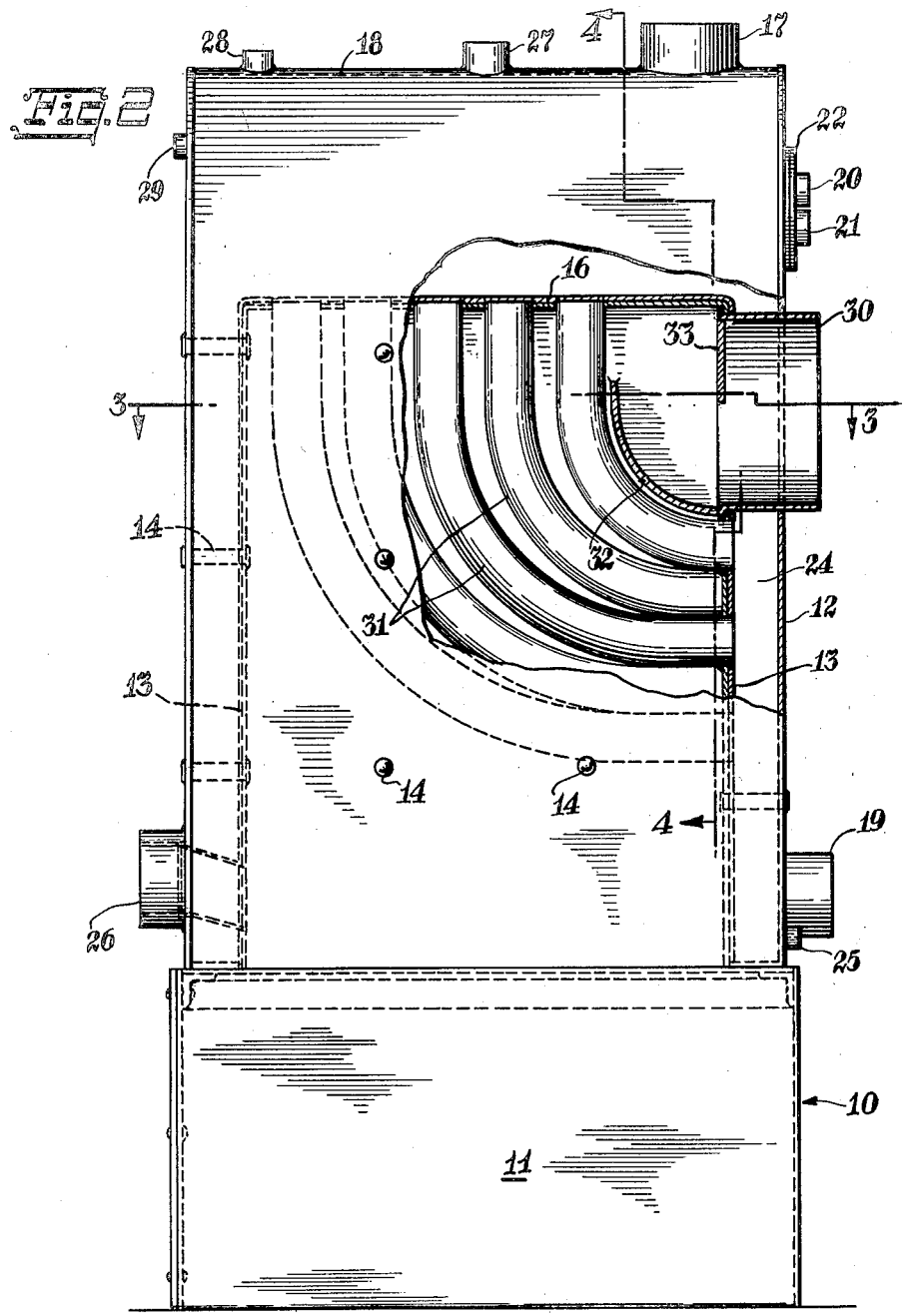

Patented Mar. 21, 1950

2,501,161

UNITED STATES PATENT OFFICE 2,501,161

WATER TUBE BOILER

Nathan Cooper, Jersey City, N. J.

Application September 19, 1946, Serial No. 697,998

1 Claim. (Cl. 122—140)

The present invention relates to improvements in boilers of the type wherein a fluid, generally water, is heated by passing through a tube which is partially exposed to the radiant heat of a flame.

With apparatus of this type it is frequently difficult to obtain adequate calefaction throughout the entire effective surface of the tubes or conduits through which passes the fluid to be heated. The reason is that the side of the tube facing the flame is exposed to the dual heating effect caused by direct radiation from the flame and by thermal conduction from the hot combustion gases which strike the conduits, whereas the side which is averted from the flame only absorbs whatever radiant heat is reflected from the walls of the combustion chamber and is frequently shielded from direct contact with the bulk of the gases. Again, in the case of multi-tube boilers, certain tubes may be partially or completely cut off from direct radiation because of interjacent conduits. On the other hand, the amount of heat to be absorbed by the tube is determined by the rate of heat transfer between the walls of the tube and the fluid, e. g. water, passing through the same, that rate in turn being a function of the cross sectional area, water velocity etc. All of these factors have practical limits, and the conduits should be designed not only for optimum rate of heat transfer, but also for structural stability at the expected operating temperature.

It is obvious that the tube constants (gauge of metal etc.) must be selected on the basis of the greatest amount of heat to be dissipated by any elemental area of the tube surface; in other words, the tube must be strong enough to withstand the temperatures developed in those parts which are closest to the flame. Thus a substantial difference in temperature between the various parts will permit a less economical design of the conduits than would be permissible if the temperature distribution were more nearly uniform all over the effective surface thereof.

Accordingly, it is an object of the present invention to provide a boiler or water heater, of the type described, wherein the tubes are arranged so as to be subject to more uniform calefaction than has heretofore been the case.

Another object of the invention is to provide an improved arrangement of boiler tubes permitting a better utilization of the space within the combustion chamber.

A further object of the invention is to provide an arrangement whereby the tubes of a boiler or the like are brought into protracted contact with the combustion gases along those parts of their surface which are not exposed to the radiant heat of the flame.

A still further object of the invention is to provide an arrangement of boiler tubes wherein the water velocity is greatest adjacent the side of the tube which lies closest to the flame.

Additional objects and features of the invention will become apparent in the course of the following description, taken in conjunction with the accompanying drawing in which a preferred embodiment thereof has been illustrated. In the drawing—

Fig. 1 is a rear elevation of a boiler according to the invention;

Fig. 2 is a side elevation of the boiler shown in Fig. 1, with part of the housing broken away to show the tubes;

Fig. 3 is a cross section on line 3—3 of Fig. 2;

Fig. 4 is a fragmentary sectional elevation taken on line 4—4 of Fig. 2.

The housing 10 of the boiler comprises the base 11, enclosing the firebox proper with the injection or other type burner (not shown), and the shell 12 which, together with the inner jacket 13 spaced therefrom by stay rods 14, encloses the upper chamber 15. The housing 10 is normally surrounded by an outer jacket, not shown, which may be lined with suitable heat insulating material and which may also serve as a casing for a motor, likewise not shown; the latter may be positioned adjacent the base 11 as a means for supplying fuel to the burner.

The double walls 12, 13 of the chamber 15 form a receptacle for the water to be heated, the water level being well above the cover portion 16 which seals the upper end of the combustion chamber. The water may serve for the generation of steam, as in a central heating system, and the steam is withdrawn from the boiler at the outlet port 17 provided on the arcuate top 18 of the shell 12. The returning condensate is reintroduced into the circuit by way of port 19 located at the bottom of chamber 15.

The boiler may also incorporate a tankless water heating system comprising a number of indirectly heated pipes, not shown, which are disposed within the space enclosed by the members 16 and 18 so as to be at least partially covered by the boiling water. The inlet and outlet connections to these pipes are indicated at 20 and 21, respectively, these connections being located on a cover plate 22 which is secured to the housing by means of screws 23.

The water space 24 surrounding the chamber 15 is further provided with a drain 25 while the chamber itself has a sight port 26 through which the performance of the burner may be observed. 27 is a safety valve, 28 a socket for a thermometer and 29 a similar socket for a steam gauge. The port 30 represents the outlet for the flue gases.

In accordance with the invention, the upper part 15 of the combustion chamber is provided with a plurality of tubes 31 through which the water may circulate from lower points adjacent the wall 13 to the space above cover member 16. As can be plainly seen from the drawing, these tubes are curved over an arc of 90 degrees and have their lower portions exposed to the radiant heat of the flame originating inside the base 11 (except where shielded by intervening conduits). Since these portions nearer the flame have a greater radius of curvature, water will flow along the inner surfaces thereof at a higher speed and an increased rate of heat transfer will result compared with conditions at other points of the tubes. While this will to some extent compensate for the difference in the amount of heat radiated upon the various portions of the tube surface, further means are provided to increase the calefaction of those parts of the conduits which are averted or remote from the flame.

An arcuate baffle member 32 extends across the full width of the chamber 15 and forces the flue gases to rise to the top of the chamber before escaping through the outlet port 30. The baffle 32 is advantageously curved similar to the tubes 31 so that the hot gases rising at the right-hand end of the chamber, as viewed in Fig. 2, will be compelled to travel along those tubes or tube surfaces which are fully or partially shielded from the flame. Furthermore, a substantial part of the gases will accumulate in the upper region of the chamber 15 and will there give up part of their heat to the vertical branches of the tubes which are remote from the flame and substantially parallel to the direction of radiation. The flue gases may be further controlled by the provision of a depending baffle 33 in the upper half of the outlet 30; this baffle may be designed so as to retard the escape of the combustion gases just enough so that a further portion of their inherent heat may be utilized for purposes of useful calefaction; the overlapping arrangement of the two baffles 32 and 33 will permit the gases to reach the flue only after repeated changes of direction as will be evident from Fig. 2.

It has been shown above that the arrangement herein disclosed results in a more uniform distribution of the heating effect throughout the tube system, since the effects of radiation and thermal conduction are caused to compensate rather than overlap each other. This tends to reduce the necessary wall thickness and, thereby, the size of the tubes, resulting in improved circulation, better space utilization and greater fuel economy together with a saving of material. The life span of the conduits should also be increased by virtue of the reduction of the strain which is normally caused by irregular thermal expansion.

The specific embodiment described has been selected for the purpose of explaining the invention to those skilled in the art who will undoubtedly be able to devise other arrangements whereby the advantages of the invention may be realized. Thus it is to be understood that the invention should not be construed as being limited to this particular embodiment and that numerous modifications and adaptations thereof may be made without departing from the spirit and scope of the invention as defined in the appended claim.

What is claimed is:

In a small compact, low cost boiler for residential heating, a rectangular, parallelepipedal fire box having water jackets on all four sides and a larger water and steam compartment on top; a plurality of water tubes communicating between the rear wall water jacket and the upper water and steam chamber, said tubes being mounted substantially parallel and being bent at right angles with even legs on both ends, the radius of the bend being smaller on the rear tubes and progressively larger toward the front of the boiler; an outlet tube for the combustion gases located near the upper edge of the rear wall of the fire box; a baffle covering nearly one half of the upper area of said outlet, and a curved baffle located in the rear of the last of said water tubes, said baffle following the curvature of said tubes.

NATHAN COOPER.

REFERENCES CITED

The following references are of record in the file of this patent:

UNITED STATES PATENTS

| Number | Name | Date |
| --- | --- | --- |
| 1,486,888 | Hawley | Mar. 18, 1924 |
| 1,666,532 | Hawley | Apr. 17, 1928 |
| 1,725,463 | Lindstrom | Aug. 20, 1929 |
| 1,953,588 | Cain | Apr. 3, 1934 |
| 2,061,087 | Power | Nov. 17, 1936 |